(12) United States Patent
Hu

(10) Patent No.: US 7,590,297 B2
(45) Date of Patent: Sep. 15, 2009

(54) PIXEL DATA COMPRESSION AND DECOMPRESSION METHOD AND DEVICE THEREOF

(75) Inventor: Po-Chin Hu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 740 days.

(21) Appl. No.: 11/277,360

(22) Filed: Mar. 24, 2006

(65) Prior Publication Data

US 2007/0189620 A1    Aug. 16, 2007

(30) Foreign Application Priority Data

Feb. 13, 2006    (TW) ................. 95104695 A

(51) Int. Cl.
G06K 9/36    (2006.01)

(52) U.S. Cl. .................. 382/238; 382/233; 382/253

(58) Field of Classification Search ......... 382/232–233, 382/238, 253, 251; 375/240.01–240.03, 375/240.12, 240.22, 240.25
See application file for complete search history.

(56) References Cited

U.S. PATENT DOCUMENTS

| 5,581,310 | A | 12/1996 | Vinekar et al. |
|---|---|---|---|
| 5,710,595 | A | 1/1998 | Hang et al. |
| 5,859,932 | A * | 1/1999 | Etoh ................. 382/253 |
| 5,867,178 | A | 2/1999 | Murphy et al. |
| 5,869,198 | A | 2/1999 | Erne et al. |
| 6,256,347 | B1 | 7/2001 | Yu et al. |
| 6,509,929 | B1 | 1/2003 | Ishikawa |
| 6,535,647 | B1 | 3/2003 | Abousleman |
| 6,570,626 | B1 | 5/2003 | Mendenhall et al. |
| 6,621,934 | B1 | 9/2003 | Yu et al. |
| 6,825,847 | B1 | 11/2004 | Molnar et al. |
| 7,136,533 | B2 * | 11/2006 | Seroussi et al. ............. 382/238 |

OTHER PUBLICATIONS

Article Titled "The LOCO-I Lossless Image Compression Algorithm: Principles and Standardization into JPEG-LS" jointly authored by Weinberger et al., IEEE Transactions on Image Processing, vol. 9, No. 8, Aug. 2000.(p. 1309-1324).

Article Titled "Quantization" jointly authored by Gray et al., IEEE Transactions on Information Theory, vol. 44, No. 6, Oct. 1998 (pp. 2325-2383).

Chapters 5, 7 and 10 of Book Titled "Vector Quantization and Signal Compression" jointly authored by Gersho et al., Boston MA. Kluwer 1992.

* cited by examiner

Primary Examiner—Sherali Ishrat
(74) Attorney, Agent, or Firm—Jianq Chyun IP Office

(57) ABSTRACT

The present invention discloses a method for compressing and decompressing pixel data and the device thereof. The method comprises receiving current pixel data from a preprocessor and comparing the current pixel data with predictor pixel data to obtain a section index from a quantization table. Output the section index to a memory as compressed data. Then, receive the compressed data from the memory. Use the quantization table to look up a representative level corresponding to the compressed data and output decompressed pixel data based on the representative level to an image processing unit. The device mentioned above comprises a memory, a compressor and a decompressor. The memory stores compressed data. The compressor quantizes and compresses pixel data and outputs the compressed pixel data to the memory. The decompressor receives the compressed pixel data and decompresses the compressed pixel data and outputs the decompressed pixel data as pixel data.

29 Claims, 7 Drawing Sheets ial no. 95104695, filed Feb. 13, 2006. All disclosure of the Taiwan application is incorporated herein by reference.

PIXEL DATA COMPRESSION AND DECOMPRESSION METHOD AND DEVICE THEREOF

CROSS-REFERENCE TO RELATED APPLICATION

This application claims the priority benefit of Taiwan application serial no. 95104695, filed Feb. 13, 2006. All disclosure of the Taiwan application is incorporated herein by reference.

BACKGROUND OF THE INVENTION

1. Field of the Invention

The present invention relates to a pixel data compression and decompression method and device thereof. More particularly, the present invention relates to a pixel data compression and decompression method and device thereof applicable to digital television.

2. Description of the Related Art

In multi-media transmission technology, digital television has become increasingly important. For example, in order to provide a list of multi-media services such as interactive television, television shopping and video-on-demand (VOD) service to every family within the USA, the Federal Communications Commission (FCC) has requested that all televisions produced after 2006 should include a built-in digital tuner. In addition, as a response to the new generation of digital broadcasting in the USA, Europe and Japan, the use of high definition (HD) digital broadcasting system for transmitting clearer images has become the upcoming trend. Accompanying the rapid development in HD broadcasting and digital television, the suppliers in various fields such as chip manufacturers and system providers gather to form unions with the common goal of developing the digital television and related markets.

One of the critical components of a digital television system is the pixel data processing device. The digital television system obtains video signals from an input channel. The pixel data processing device can rely on various image-processing techniques to enhance the quality of the video signals and output the processed video signals to the cathode ray tube or television panel suitable for display. Therefore, the pixel data processing device can directly affect the user's perception of video quality. At present, the picture resolution of a high definition television (HDTV) has raised to 1920×1080 pixels. Thus, the mass of data that needs to be processed at any one time by the HDTV is roughly six times of a conventional television. In other words, the newer generation of pixel data processing devices not only has to provide clear images, but also requires a strong computational capacity For processing substantial amount of high picture quality data. To satisfy the present and future processing requirements of high definition television, the inventors have to provide an innovative design that can reduce overall data bandwidth.

FIG. 1 is a block diagram of a conventional pixel data processing device 100. As shown in FIG. 1, the video input coming from an input channel will be individually pre-processed inside a pre-processing unit 101. The pre-processor includes an analogue-to-digital (AD) converter or a video decoder, for example. When the line buffer 102 of the pre-processor is fully loaded, the memory management unit 104 will write the pre-processed data from the line buffer 102 into the memory 104. On the other hand, the image-processing unit 106 will read video data through the memory management unit 103 and transfer to the line buffer 105. The image-processing unit 106 can perform complicated image-processing algorithms such as de-interlacing, color processing, noise canceling or contrast enhancing. Therefore, the image-processing unit 106 is often designed with a high operating efficiency and parallel processing architecture.

However, the image-processing unit 106 of the pixel data processing device 100 has to wait until the pixel data to be processed is ready in the line buffer 105. Therefore, the problem of having insufficient frequency bandwidth in the memory management unit 103 is frequently encountered. A direct solution to this problem includes increasing the clock rate and width of the memory data bus. Yet, this will increase the production cost significantly. Other examples, including the U.S. Pat. Nos. 5,869,198 and 6,570,626, can reduce the graphic data bandwidth but provide no direct solution to the video data bandwidth problem.

SUMMARY OF THE INVENTION

Accordingly, at least one objective of the present invention is to provide a method for compressing and decompressing pixel data that can reduce video data bandwidth, adjust the difference in the input/output speed of the video data and resolve insufficient memory bus bandwidth problem. In addition, the method can be applied to digital television such as high definition television for processing image data.

At least another objective of the present invention is to provide a pixel data compression and decompression device that can resolve insufficient memory bus bandwidth problem, adjust the differing input/output speed of the video data and reduce video data bandwidth. Moreover, the pixel data compression and decompression device is adapted to the digital television structure used by high definition televisions.

To achieve these and other advantages and in accordance with the purpose of the invention, as embodied and broadly described herein, the invention provides a method for compressing and decompressing pixel data. The pixel data compression and decompression method comprises receiving current pixel data from a preprocessor. Then, compare the current pixel data with predictor pixel data to obtain a section index from a quantization table. Output the section index to a memory as compressed data. Thereafter, receive the compressed data from the memory and use the quantization table to look up a representative level corresponding to the compressed data. According to the representative value and the predictor pixel data, compute and Output decompressed pixel data to an image-processing unit.

According to one preferred embodiment of the present invention, the foregoing method for compressing and decompressing the pixel data further includes executing the following steps for each possible predictor pixel data. Use at least one training image to calculate the conditional distribution function corresponding to the predictor pixel data. Then, assign a number of interval distances to the conditional distribution function. Thereafter, use the foregoing assigned results to serve as the quantization table corresponding to the predictor pixel data. Moreover, the step of outputting the section index to a memory as compressed data further includes using a fixed size packet as a unit for outputting the compressed data. The size of the packet is based on the data bus width of the memory.

According to another perspective, the present invention also provides a pixel data compression and decompression device comprising a memory, a compressor and a decompressor. The memory stores compressed data. The compressor receives current pixel data from the pre-processing unit. According to the current pixel data and the predictor pixel data corresponding to the current pixel data, a section index is obtained from the quantization table. The section index value treated as a compressed data is output to the memory. The decompressor receives the compressed pixel data from the memory and uses the quantization table to look up the representative value corresponding to the compressed data. According to the representative value and the predictor pixel data, the decompressor computes and outputs decompressed pixel data to the image-processing unit.

According to one preferred embodiment of the present invention, the foregoing pixel data compression and decompression device further includes a memory management unit coupled to the memory, the compressor and the decompressor. The memory management unit receives and processes requests of the compressor and decompressor for accessing the memory. Furthermore, each possible predictor pixel data has a corresponding quantization table. The quantization table is established by assigning a number of interval distances to the conditional distribution function. The conditional distribution function is the result of a computation based on at least one training image. The pixel data compression and decompression device further includes a packet generator for outputting compressed data to the memory using a fixed-size packet as a unit. The size of the packet is based on the width of the data bus in the memory.

Accordingly, the present invention utilizes the quantization of compressed/decompressed pixel data and the control of the flow of data packets to resolve the problem of insufficient memory bandwidth, adjust the difference in the input/output rate of the video data and minimize the video data bandwidth requirement. Furthermore, the present invention is particularly adapted to a broadcasting system having the digital television architecture.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
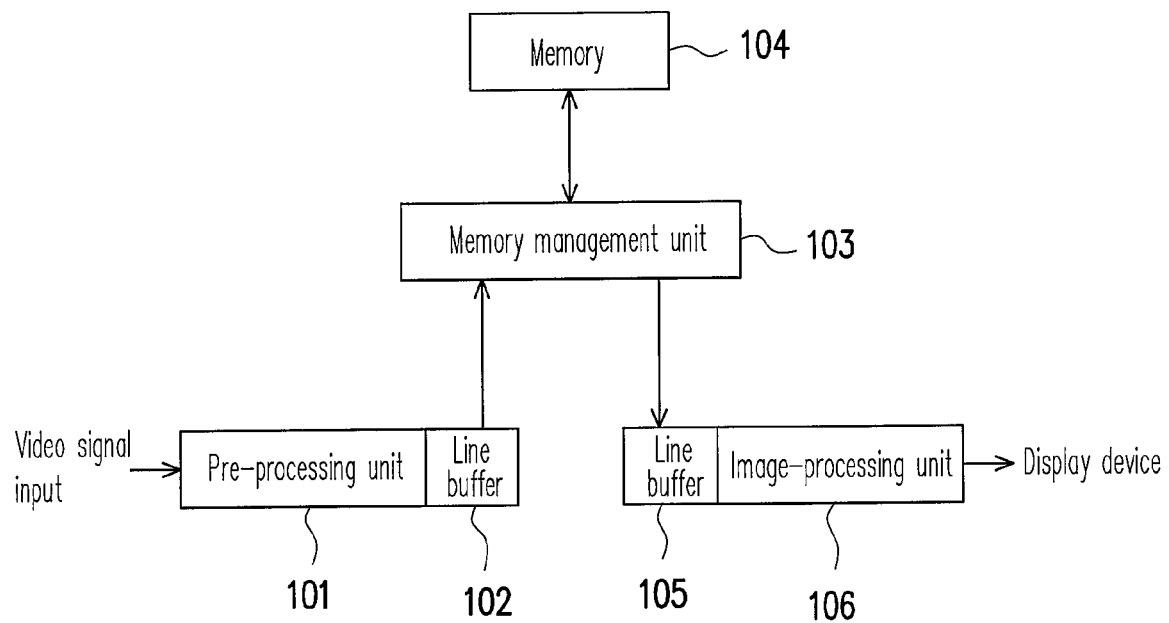
FIG. 1 is a block diagram of a conventional pixel data processing device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
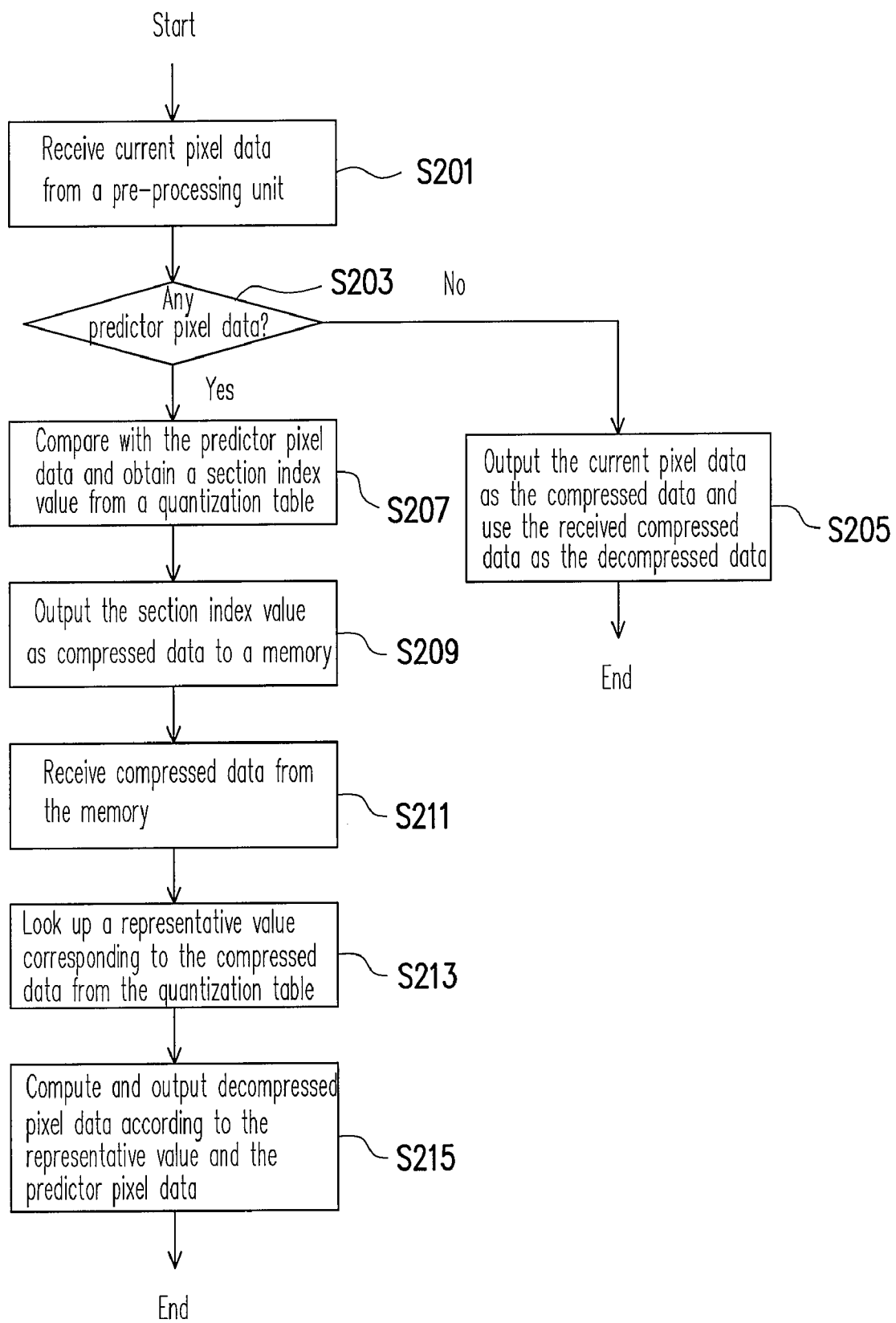
FIG. 2 is a flow diagram slowing the steps for compressing and decompressing pixel data according to one embodiment of the present invention.

FIG. 2 is a flow diagram showing the steps for compressing and decompressing pixel data according to one embodiment of the present invention. The present embodiment utilizes conditional differential pulse code modulation (CDPCM) to quantize and compress the image data so that actual number of transmitted bits is reduced. The flow of the packets is also carefully monitored and controlled so that the input and output of video data is optimized for the highest transmission rate. In addition, the CDPCM technique is used to decompress the image data.

First, in step S201, receive current pixel data from a pre-processing unit. The current pixel data is one component of a color pixel such as red, green or blue. Then, in step S203, determine if the current pixel data has any corresponding predictor pixel data. In the present embodiment, the pixel of the predictor pixel data is the previous pixel of the pixel of the current pixel data. For example, if the current pixel data is a red component of the current pixel, then the predictor pixel data is the red gray scale value of a previous pixel. If the current pixel data has no corresponding predictor pixel data, for example, the current pixel is the first pixel, then jump to step S205 to output the current pixel data as compressed data. Furthermore, the received compressed data serves as decompression pixel data and is output accordingly. On the other hand, if the current pixel data has a corresponding predictor pixel data, jump to step S207 to compare the current pixel data with the predictor pixel data and compute the difference between the current pixel data and the predictor pixel data. Thereafter, use the quantization table corresponding to the predictor pixel data to look up the section index value corresponding to the foregoing difference between the current pixel data and the predictor pixel data.

Then, in step S209, output the section index value as compressed data to a memory. The compressed data can be output in fixed size packets. The size of each packet is based on the data bus width of the memory, for example, 32 bits. If the pixel has a number of components, for example, the three primary colors red, green and blue, then the three components are independently compressed but can be accommodated within the same packet. In other words, a single packet may comprise a plurality of component pixel data of at least one pixel. To find the optimum transmission rate between the output pixel data and the input pixel data, the average packet transmission rate in each clock cycle can be computed. The average packet transmission rate can be represented by S/T, where S and T are positive integers with 1 as the greatest common divisor and an average of S packets is sent to the memory in T clock cycles.

After outputting the compressed data, in step S211, receive the compressed data from the memory. On average, S packets are received within T clock cycles to match the transmission rate. Then, in step S213, use the quantization table to look up the compressed data, that is, to find the representative value corresponding to the previously output section index value. After that, in step S215, compute the result of adding the predictor pixel data to the representative value and use that result as the pixel data after decompression. Finally, the pixel data is output to the image-processing unit.

Figure 3:
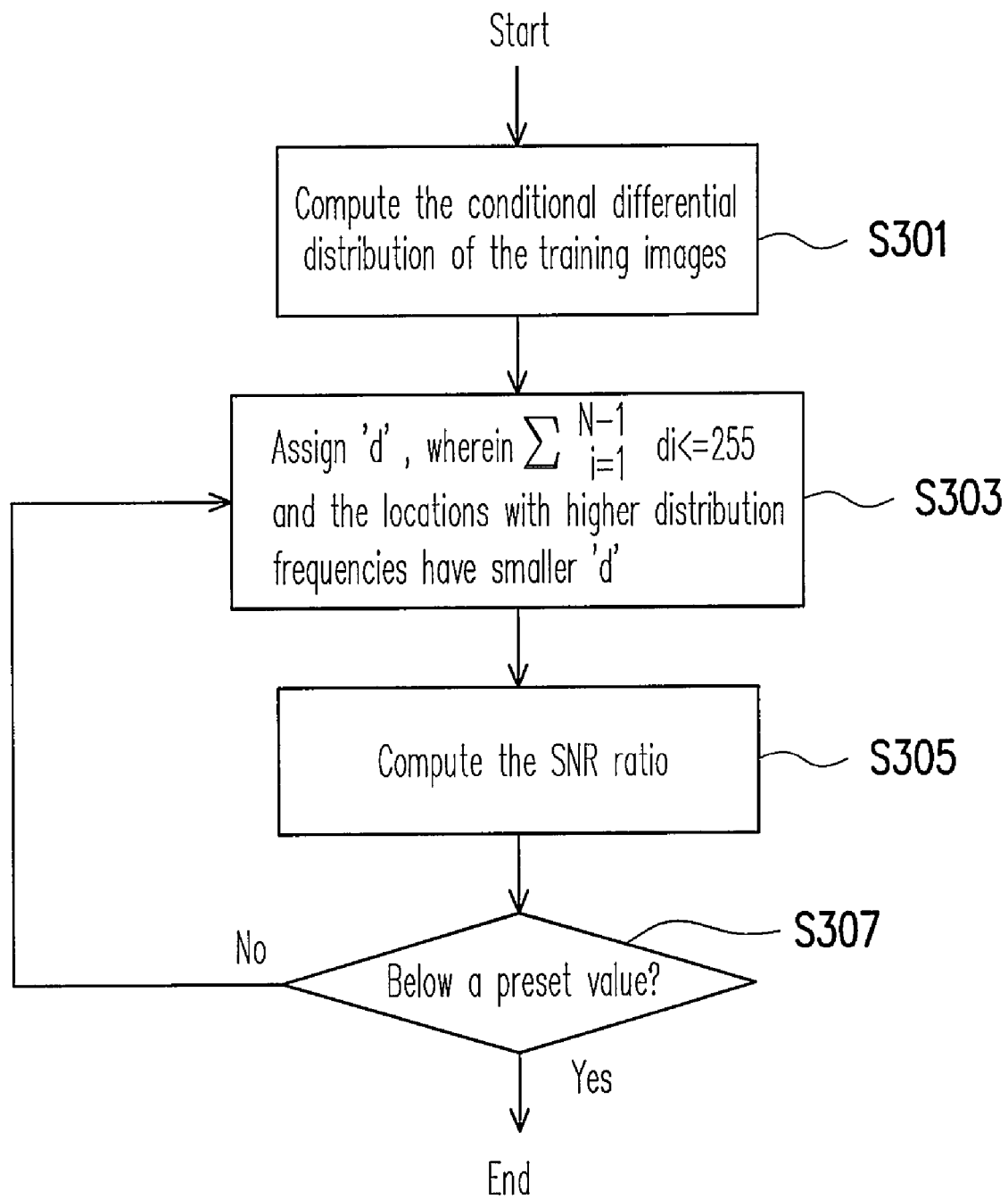
FIG. 3 is a flow diagram slowing the training exercises for obtaining a quantization table according to one embodiment of the present invention.

In the following, the quantization table used in the present embodiment is explained in mole detail. FIG. 3 is a flow diagram showing the training exercises for obtaining a quantization table according to one embodiment of the present invention. Because the quantization table directly determines the image data compression quality, the present embodiment uses at least one training image to compute the conditional distribution function corresponding to each predictor pixel data. As the following description shows, the conditional distribution function is defined as the frequency distribution of the difference between the current pixel data and the predictor pixel data under the condition of the predictor pixel data having a specified value.

Figure 4:
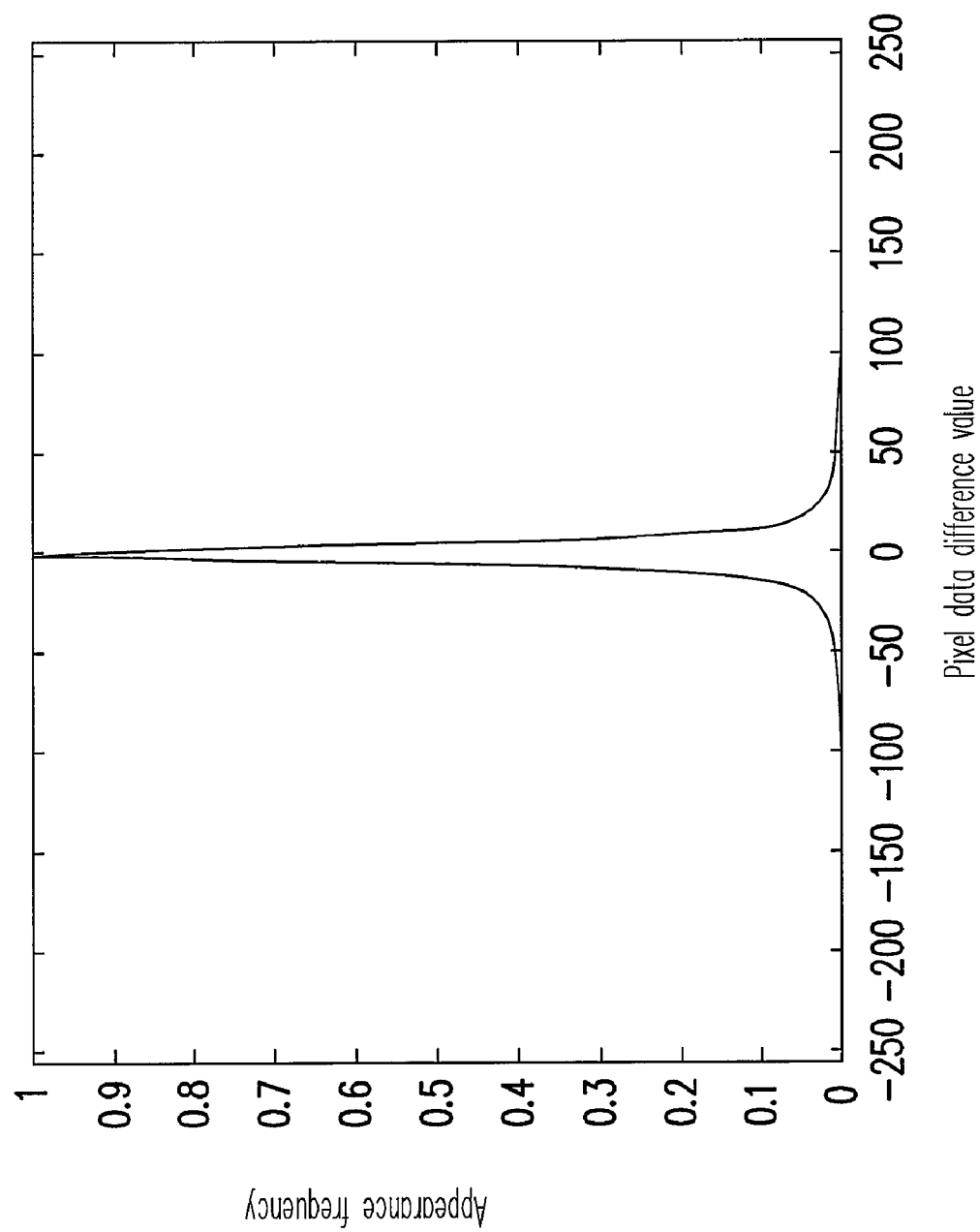
FIG. 4 is a graph showing the differential frequency distribution of pixel data according to one embodiment of the present invention.
Figure 5:
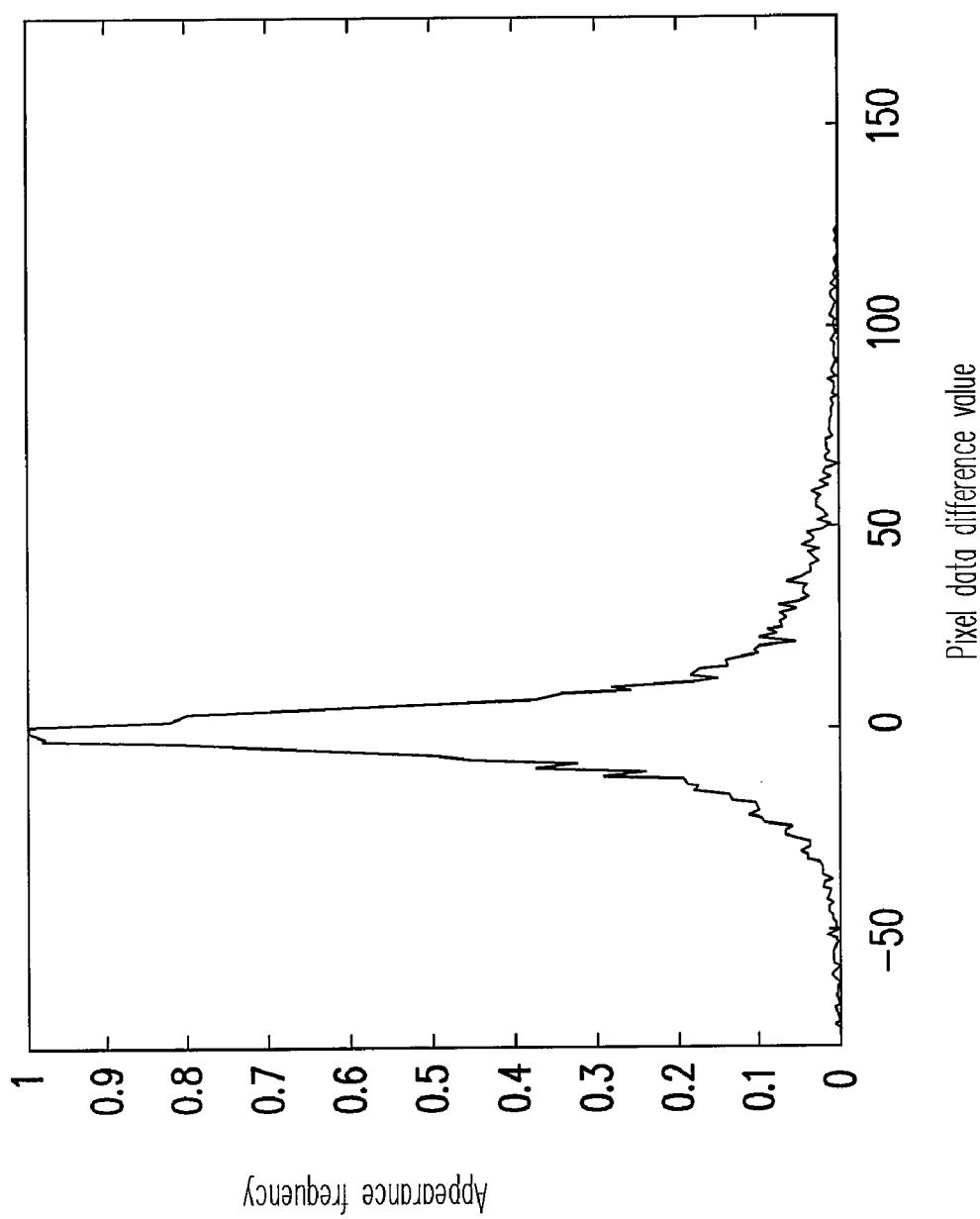
FIG. 5 is a graph slowing the conditional differential frequency distribution of pixel data according to one embodiment of the present invention.

First, in step S301, compute the conditional differential histogram of the training images. In the present embodiment, seven widely used pictures including Baboon, Barabara, Boat, Goldhill, Lenna, Peppers and Zelda are used in the training exercise. FIG. 4 is a graph showing the differential frequency distribution of pixel data after the foregoing training exercise, that is, the distribution chart obtained after subtracting the predictor pixel data from the current pixel data. FIG. 5 is another graph showing the frequency distribution after subtracting the predictor pixel data from the current pixel data with the condition that the predictor pixel data is equal to 80. The vertical axis in FIGS. 4 and 5 shows the frequency of appearance of the difference value and the horizontal axis is the pixel data difference value. The higher the height of the curve at a particular difference value of the pixel data is, the higher the frequency of appearance of that pixel difference value will be. Because the vertical axis has been normalized, the maximum value of the vertical axis is 1 in FIGS. 4 and 5. In FIG. 5, the pixel data difference value and the appearance frequency contrast each other to form the conditional distribution function of the predictor pixel data 80. Since the conditional differential frequency distribution diagram has a more concentrated dynamic range, the conditional differential frequency distribution graph as shown in FIG. 5 is used to design the quantization table. A conditional distribution function similar to FIG. 5 will change according to the value of the predictor pixel data. Therefore, the conditional distribution function of each one of the possible predictor pixel data must be computed so that a quantization table is produced for each possible predictor pixel data.

Figure 6:
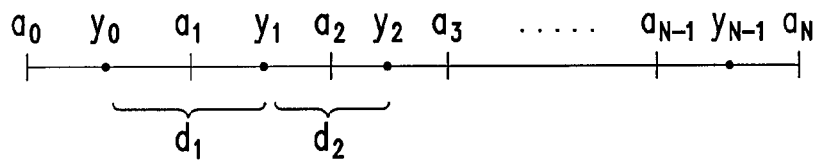
FIG. 6 is a sketch of a quantization line according to one embodiment of the present invention.

FIG. 6 is a sketch of the quantized intervals along a quantization line. In FIG. 6, there are N intervals with $a_0$ to $a_N$ representing the boundaries or the various intervals, $y_0$ to $y_{N-1}$ representing the representative values within the intervals, and $d_1$ to $d_{N-1}$ representing the internal distances between the foregoing representative values. When the difference value between the current pixel data and the predictor pixel data falls within the interval $a_0$ to $a_1$, the section index has the value zero. When the difference value between the current pixel data and the predictor pixel data falls within the interval $a_1$ to $a_2$, the section index has the value one, and so on. When the pixel data difference value falls within the interval $a_{N-1}$ to $a_N$, the output value is N−1. In the present embodiment, the representative value 'y' is the average of the neighboring 'a' values and the interval distance between neighboring representative values 'y' is 'd', for example, the interval distance between $y_0$ and $y_1$ is $d_1$ and the interval distance between $y_1$ and $y_2$ is $d_2$.

Back to FIG. 3, the next step S303 includes assigning interval distance 'd' to the conditional distribution function of the predictor pixel data. Here, $\sum_{i=1}^{N-1} d_i \leq 225$ (the size of the pixel data in the present embodiment is 8 bits), and the higher points in the conditional differential distribution diagram will be assigned a smaller interval distances 'd'. In other words, the smaller interval distances are assigned to areas in the conditional distribution function with a higher frequency of appearance and the assigned results are used as the quantization table that corresponds to the predictor pixel data.

After obtaining the quantization table for all the predictor pixel data in the foregoing steps, the signal-to-noise ratio of the quantization table is computed in step S305 to assess the compression quality of the quantization table. The signal-to-noise ratio is computed based on the current pixel data and the decompressed pixel data. The signal-to-noise ration can be implemented as the ratio between the average current pixel power to power of error between the current pixel data and the decompressed pixel data. Next, in step S307, a judgment is made in which the foregoing quantization table is assessed using the SNR value. If the SNR value of the quantization table is still not below a preset value, return to step S303 for re-assigning the interval distances 'd' and re-establishing another batch of quantization tables. On the contrary, if the SNR value of the quantization table has already dropped below the preset value, the current batch of quantization tables is used. To save storage space, a multiple of predictor pixel data can use the same quantization table. For example, four predictor pixel data with consecutive values may share the same quantization table, thereby saving 75% of the storage space.

Figure 7:
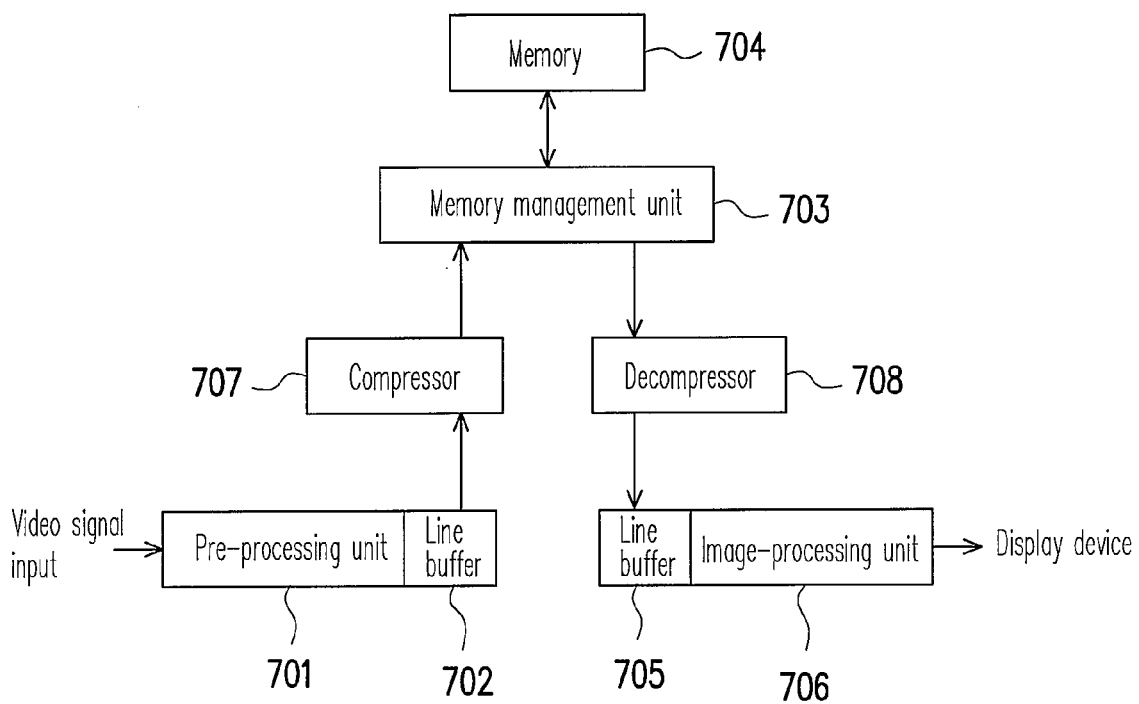
FIG. 7 is a block diagram showing the circuit of a pixel data compression and decompression device according to another embodiment of the present invention.

Besides the aforementioned method for compressing and decompressing pixel data, the present invention also provides a device for executing the foregoing method. FIG. 7 is a block diagram showing the circuit of a pixel data compression and decompression device 700 according to another embodiment of the present invention. The pixel data compression and decompression device 700 comprises a pre-processing unit 701, line buffers 702 and 705, a memory management unit 703, a memory 704, an image-processing unit 706, a compressor 707 and a decompressor 708. The memory management unit 703 is coupled to the memory 704, the compressor 707 and the decompressor 708. It receives and processes the requests from the compressor 707 and the decompressor 708 for accessing the memory 704. Video data is input to the pre-processing unit 701 and sent to the compressor 707 through the line buffer 702. The data from the decompressor 708 is output to the line buffer 705. After some processing treatment within the image-processing unit 706, the data is redirected to a display device.

The compressor 707 receives current pixel data from the pre-processing unit 701. According to the current pixel data and the corresponding predictor pixel data, a section index value is obtained from the quantization table. The section index value is output to the memory 704 as compressed data. Furthermore, the pixel of the predictor pixel data is the previous pixel of the pixel of the current pixel data. If the current pixel data has no corresponding predictor pixel data, the compressor 707 outputs the current pixel data as the compressed data and the decompressor 708 uses the received compressed data as the decompressed pixel data.

The compressor 707 computes the difference value between the current pixel data and the predictor pixel data and uses the quantization table corresponding to the predictor pixel data to look up the section index value. Each possible predictor pixel data has a corresponding quantization table. Similarly, the quantization table is produced through the assignment of a plurality of interval distances to the conditional distribution functions. The prevent indecision, the interval distances are odd numbers by design. Moreover, the smaller interval distances are assigned to those conditional distribution functions having a higher appearance frequency density of image data. The conditional distribution functions are computed based on at least one training image. Furthermore, the conditional distribution functions can be the distribution function of the difference value between the pixel data and the predictor pixel data for limited predictor pixel data. Moreover, to provide more efficient processing of the image data, a multiple of predictor pixel data may share the same quantization table.

The decompressor 708 receives the compressed data from the memory 704 and uses the quantization table to look up a representative value corresponding to the compressed data. According to the representative value and the predictor pixel data, the decompressor 708 computes and outputs the decompressed pixel data to the image-processing unit 706. The decompressor 708 uses the result of adding the representative value to the predictor pixel data as the decompressed pixel data.

Figure 8:
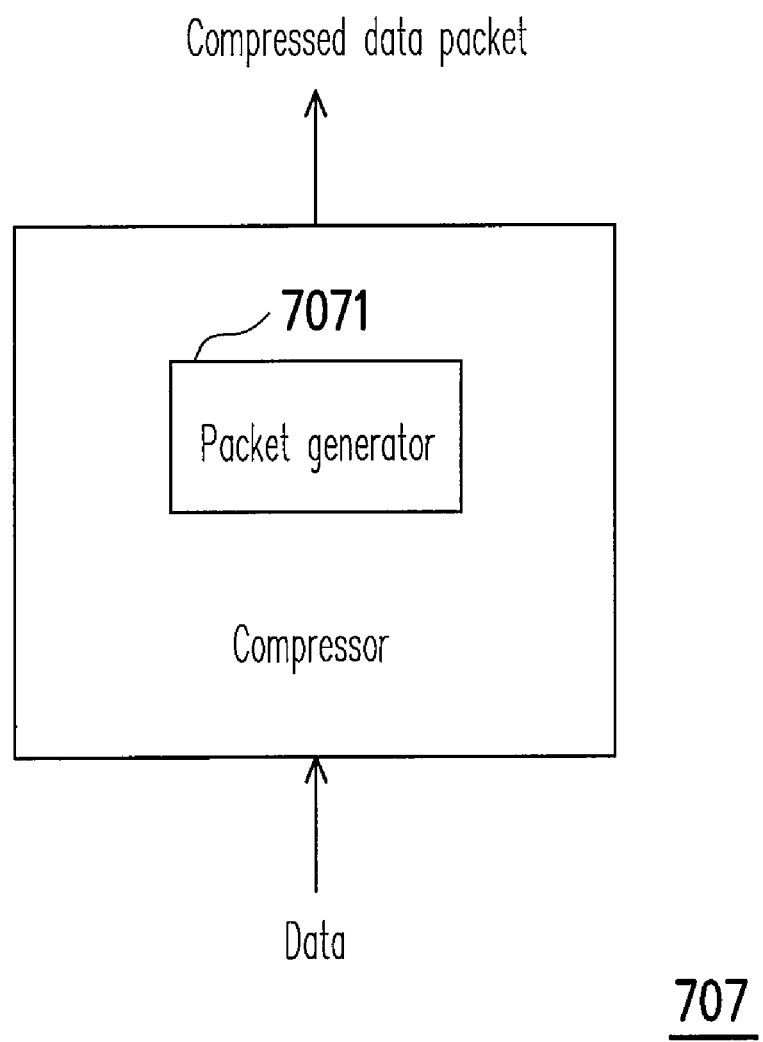
FIG. 8 is a block diagram slowing the circuit of the compressor shown in FIG. 7.

FIG. 8 is a block diagram showing the circuit of a compressor 707. The compressor 707 includes a packet generator 7071. The package generator 7071 uses a fixed size packet as unit to output compressed data to the memory 704. The size of each packet depends on the data bus width of the memory 704. Each packet may include at least a plurality of pixels. The packet generator 7071 computes the average packet transmission rate S/IT in each clock cycle, where S and T are positive integers with 1 as the greatest common divisor. Then, S packets are sent to the memory 704 within T clock cycles on average. Moreover, the S/T ratio is approximately equal to the average packet transmission rate. With this packet design, the decompressor 708 will receive S packets from the memory 704 in T clock cycles on average.

In summary, the present invention uses the CDPCM method to quantize the compression/decompression pixel data and uses an algorithm to average out the packet transmission rate. As a result, the video data bandwidth is reduced, the video data input/output rate is optimized and the problem of having an insufficient data bus bandwidth is also resolved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for compressing and decompressing pixel data, comprising the steps of:
    (a) receiving current pixel data from a pre-processing unit;
    (b) retrieving a section index value from a quantization table according to the current pixel data and a predictor pixel data corresponding to the current pixel data;
    (c) outputting the section index value as a compressed data to a memory;
    (d) receiving the compressed data from the memory;
    (e) looking up from the quantization table for a representative value corresponding to the compressed data; and
    (f) computing a decompressed pixel data according to the representative value and the predictor pixel data and outputting the decompressed pixel data to an image-processing unit.

2. The method of claim 1, wherein the pixel of the predictor pixel data is the previous pixel of the pixel of the current pixel data.

3. The method of claim 1, further comprising:
    if there is no corresponding predictor pixel data to the current pixel data, then output the current pixel data as the compressed data and receive the compressed data as the decompressed pixel data.

4. The method of claim 1, the step (b) further comprising:
    computing the difference between the current pixel data and the predictor pixel data; and
    looking up the section index value corresponding to the difference from the quantization table corresponding to the predictor pixel data;
    and the step (f) further comprising:
    using the result of adding the representative value to the predictor pixel data as the decompressed pixel data.

5. The method of claim 4 further comprises executing the following steps for each possible predictor pixel data:
    (g) computing a conditional distribution function that corresponds to the predictor pixel data using at least a training image;
    (h) assigning a number of interval distances to the conditional distribution function; and
    (i) using the foregoing results of the assignment as the quantization table corresponding to the predictor pixel data.

6. The method of claim 5, wherein a multiple of predictor pixel data shares the same quantization table.

7. The method of claim 5, wherein the conditional distribution function is the distribution function of the difference between the current pixel data and the predictor pixel data under the condition of the predictor pixel data.

8. The method of claim 5, wherein the interval distances are odd numbers.

9. The method of claim 5, further comprising:
    assigning the smaller ones of the interval distances to areas in the conditional distribution function with a higher density.

10. The method of claim 5, further comprising:
    using a signal-to-noise ratio to assess all quantization tables, wherein the signal-to-noise ratio is computed based on the current pixel data and the decompressed pixel data;
    if the signal-to-noise ratio is not lower than a preset value, return to the step (h) until the signal-to-noise ratio falls below the preset value.

11. The method of claim 10, wherein the signal-to-noise ratio is the ratio between the average power rating of the current pixel data and the error power rating between the current pixel data and the decompressed pixel data.

12. The method of claim 1, wherein the step (c) further comprises:
    outputting the compressed data using fixed size packets, wherein the size of the packets depends on the data bus width of the memory.

13. The method of claim 12, wherein the packet comprises a plurality of component pixel data of at least a pixel.

14. The method of claim 12, further comprising:
    computing an average packet transmission rate for each clock cycle;
    representing the average packet transmission rate by S/T, where S and T are positive integers with 1 as their greatest common divisor; and
    outputting S packets to the memory in T clock cycles on average.

15. The method of claim 14, further comprising:
    receiving S packets from the memory in T clock cycles on average.

16. A pixel data compression and decompression device, comprising:
    a memory;

a compressor capable of receiving a current pixel data from a pre-processing unit, retrieving a section index value from a quantization table according to the current pixel data and a predictor pixel data corresponding to the current pixel data, and outputting the section index value as a compressed data to the memory; and a decompressor capable of receiving the compressed data from the memory, looking up a representative value corresponding to the compressed data from the quantization table that corresponds to the predictor pixel data, computing a decompressed pixel data according to the representative value and the predictor pixel value and outputting the decompressed pixel data to an image-processing unit.

17. The device of claim 16, further comprising:

a memory management unit coupled to the memory, the compressor and the decompressor for receiving and processing the requests from the compressor and decompressor for accessing the memory.

18. The device of claim 16, wherein the pixel of the predictor pixel data is the previous pixel of the pixel of the current pixel data.

19. The device of claim 16, wherein, if there is no predictor pixel data corresponding to the current pixel data, the compressor outputs the current pixel data as the compressed data, and the decompressor uses the received compressed data as the decompressed pixel data.

20. The device of claim 16, wherein the compressor computes the difference value between the current pixel data and the predictor pixel data and looks up the section index value corresponding to the difference vale from the quantization table corresponding to the predictor pixel data, and the decompressor uses the result of adding the predictor pixel data to the representative value as the decompressed pixel data.

21. The device of claim 20, wherein each possible predictor pixel data has a corresponding quantization table, the quantization table is produced by assigning a number of interval distances to a conditional distribution function, and the conditional distribution function is computed based on at least a training image.

22. The device of claim 21, wherein a plurality of predictor pixel data share the same quantization table.

23. The device of claim 21, wherein the conditional distribution function is a distribution function of the difference value between the current pixel data and the predictor pixel data under the condition of the predictor pixel data.

24. The device of claim 21, wherein the interval distances are odd numbers.

25. The device of claim 21, wherein the smaller interval distances are assigned to areas of the conditional distribution function with a higher density.

26. The device of claim 16, wherein the compressor further comprises:

a packet generator using fixed sized packets as units for outputting the compressed data to the memory, wherein the size of each packet depends on the data bus width of the memory.

27. The device of claim 26, wherein each packet comprises a plurality of component pixel data of at least a pixel.

28. The device of claim 26, wherein the package generator computes an average packet transmission rate for each clock cycle and outputs S packets to the memory in T clock cycles on average, where S and T are positive integers with 1 as their greatest common divisor and the ratio S/T is approximately equal to the average packet transmission rate.

29. The device of claim 28, wherein the decompressor receives S packets from the memory in T clock cycles on average.

* * * * *